US012667505B2

(12) United States Patent
Hadimulia

(10) Patent No.: US 12,667,505 B2
(45) Date of Patent: Jun. 30, 2026

(54) BED ASSIST RAIL

(71) Applicant: Irviany Hadimulia, Maroubra (AU)

(72) Inventor: Irviany Hadimulia, Maroubra (AU)

( * ) Notice: Subject to any disclaimer, the term of this patent is extended or adjusted under 35 U.S.C. 154(b) by 7 days.

(21) Appl. No.: 18/810,977

(22) Filed: Aug. 21, 2024

(65) Prior Publication Data

US 2026/0053686 A1 Feb. 26, 2026

(51) Int. Cl.
*A61G 7/053* (2006.01)
*A47C 21/08* (2006.01)

(52) U.S. Cl.
CPC .............. *A61G 7/053* (2013.01); *A47C 21/08* (2013.01)

(58) Field of Classification Search
CPC ................................ A61G 7/053; A47C 21/08
See application file for complete search history.

(56) References Cited

U.S. PATENT DOCUMENTS

| | | | | |
|---|---|---|---|---|
| 5,463,784 | A * | 11/1995 | Alpern | A47C 21/08 5/426 |
| 7,805,789 | B1 * | 10/2010 | Dean | A61G 7/053 5/646 |
| 11,259,643 | B1 * | 3/2022 | Flannery | A47C 21/08 |
| 2005/0262632 | A1 * | 12/2005 | Wu | A61G 7/0507 5/426 |
| 2006/0174408 | A1 * | 8/2006 | Flannery | A61G 7/0507 5/426 |
| 2007/0083994 | A1 * | 4/2007 | Miller | A47C 21/08 5/430 |
| 2007/0151032 | A1 * | 7/2007 | Heavrin | A47C 21/08 5/662 |
| 2011/0185507 | A1 * | 8/2011 | Abernathey | A61G 7/015 5/662 |
| 2015/0216750 | A1 * | 8/2015 | Miller | A61G 7/0518 29/428 |
| 2016/0360895 | A1 * | 12/2016 | Miller | A61G 7/053 |
| 2018/0116886 | A1 * | 5/2018 | Miller | A61G 7/0518 |
| 2020/0323716 | A1 * | 10/2020 | Gallagher | A61G 7/0533 |
| 2021/0369523 | A1 * | 12/2021 | Kousik | A61G 7/0518 |
| 2022/0053943 | A1 * | 2/2022 | He | A47C 21/08 |
| 2024/0164963 | A1 * | 5/2024 | Higgins | A61G 7/0508 |
| 2024/0349899 | A1 * | 10/2024 | Hart | A47C 21/08 |
| 2025/0261763 | A1 * | 8/2025 | Higgins | A47C 21/08 |

* cited by examiner

*Primary Examiner* — William Kelleher
(74) *Attorney, Agent, or Firm* — Eric Harich; Karich & Associates

(57) ABSTRACT

A bed assist rail has a pair of vertical support arms that are laterally spaced by a connecting crossbar. Each of the pair of vertical support arms has a top end, a bottom end, and a middle portion. An anchor structure extends from the bottom ends of the pair of vertical support arms, for supporting the pair of vertical support arms in an upright configuration adjacent an edge of a mattress when the anchor structure is positioned under the mattress. A handle rail includes an upper portion that extends to ends, each of the ends being pivotally mounted to one of the pair of vertical support arms. The handle rail pivots between a raised position and a lowered position. A locking mechanism locks the handle rail in the raised position, and a release mechanism releases the locking mechanism to enable the handle rail to pivot to the lowered position.

7 Claims, 4 Drawing Sheets

BED ASSIST RAIL

BACKGROUND OF THE INVENTION

Field of the Invention

This invention relates generally to assistance railings, and more particularly to an assist rail to be mounted to a bed frame for assisting a person with getting in and out of the bed.

Description of Related Art

Bed rail assemblies are known in the art, and are useful in assisting impaired persons (e.g., the elderly, disabled, pregnant, and very young) with getting in and out of bed.

Conventional bed guard rail assemblies may help a person to stay in bed, but don't provide mobility support, but usually have one or more disadvantages. For example, Herz, U.S. Pat. No. 2,649,594, teaches a bed guard that functions to keep a person from falling out of bed. These types of systems tend to be large and bulky, making assembly and disassembly difficult, and storage impractical.

SUMMARY OF THE INVENTION

The present invention teaches certain benefits in construction and use which give rise to the objectives described below.

The present invention provides a bed assist rail that includes a pair of vertical support arms that are laterally spaced by a connecting crossbar, each of the pair of vertical support arms having a top end, a bottom end, and a middle portion. An anchor structure extends from the bottom ends of the pair of vertical support arms, for supporting the pair of vertical support arms in an upright configuration adjacent the edge of the mattress when the anchor structure is positioned under the mattress. A handle rail includes an upper portion that extends to ends, and each of the ends are pivotally mounted to one of the pair of vertical support arms. The handle rail pivots between a raised position wherein the handle rail extends upwardly above the mattress, and a lowered position wherein the handle rail is folded downwardly against the pair of vertical support arms. A locking mechanism locks the handle rail in the raised position, and a release mechanism releases the locking mechanism to enable the handle rail to pivot to the lowered position.

A primary objective of the present invention is to provide a bed assist rail having advantages not taught by the prior art.

Another objective is to provide a bed assist rail having a handle rail that can be pivoted downwardly and out of the way.

Another objective is to provide a bed assist rail that is height-adjustable to adapt to different users and mattresses/bedframes.

A further objective is to provide a bed assist rail that may be easily but securely mounted to a bed.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention.

DETAILED DESCRIPTION OF THE INVENTION

The above-described drawing figures illustrate the invention, a bed assist rail for providing support for a person getting in and out of bed. The bed assist rail may be particularly useful for the elderly, pregnant, and disabled, though obviously the bed assist rail may be used by anyone who would appreciate assistance in getting into or out of bed.

Figure 1:
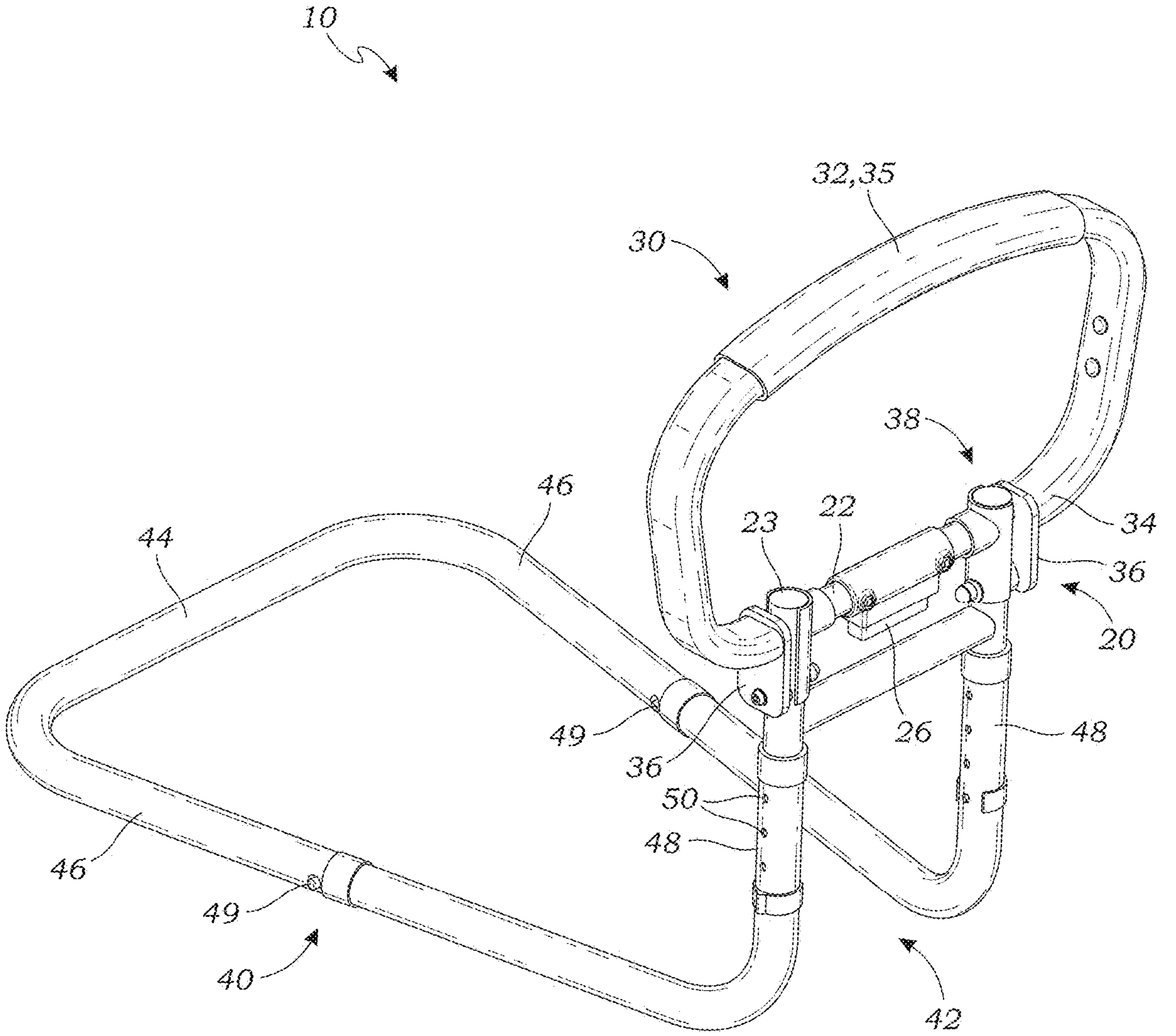
FIG. 1 is a front perspective view of a bed assist rail according to one embodiment of the present invention, illustrating a handle rail in a raised position.
Figure 2:
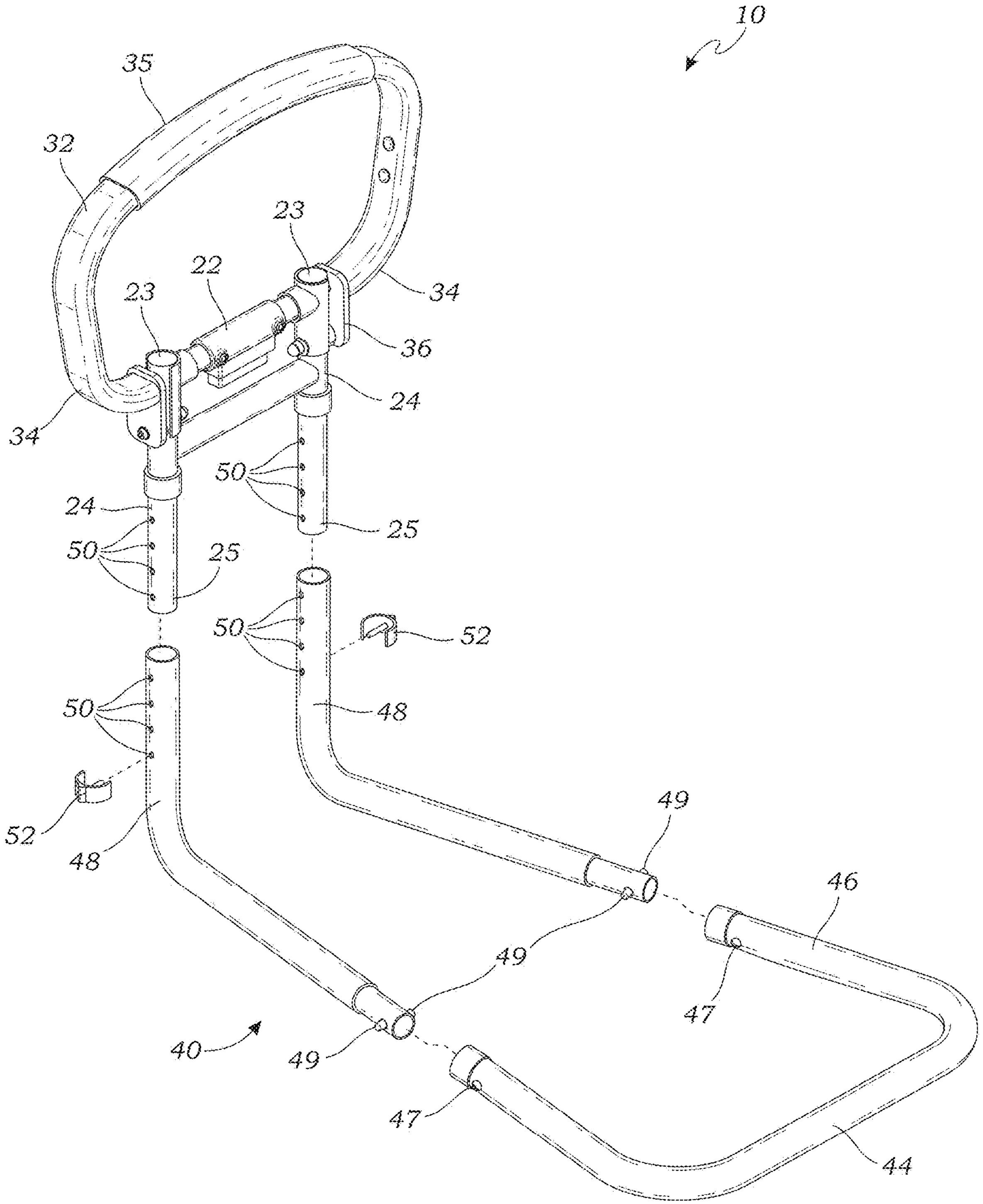
FIG. 2 is an exploded rear perspective view thereof.

FIG. 1 is a front perspective view of a bed assist rail 10 according to one embodiment of the present invention, illustrating a handle rail 30 in a raised position. FIG. 2 is an exploded rear perspective view thereof. As shown in FIGS. 1-2, the bed assist rail 10 comprises a pair of vertical support arms 20, an anchor structure 40, and the handle rail 30, each component being discussed in greater detail below. The bed assist rail 10 provides a stable support to get in and out of bed, and may be height-adjustable, as discussed below.

As illustrated, the pair of vertical support arms 20 are positioned between and connected to both the anchor structure 40 and the handle rail 30. The pair of vertical support arms 20 are laterally spaced by a connecting crossbar 22, and each of the pair of vertical support arms 20 comprises a top end 23, a bottom end 24, and a middle portion 25. Further, in this embodiment, the support arms 20 are tubular in construction, in this case, having a round cross sectional shape; however, in alternative embodiments, the support arms 20 may be in the form of rods, or tubular with a non-round cross sectional shape (e.g., square, oval, etc.).

As shown in FIGS. 1-2, the handle rail 30 includes an upper portion 32 that extends to ends 34, each of the ends 34 being pivotally mounted to one of the pair of vertical support arms 20. The upper portion 32 is adapted to be gripped by the user, and may be any lateral width suitable for this purpose, and may further include an annular cuff 35 to provide padding and texture, or a similar feature may be included. In this embodiment, the handle rail 30 extends downwardly from the upper portion 32, and then inwardly to the ends 34 that attach to the vertical support arms 20, forming a semi-loop. However, in other embodiments, the handle rail 30 may have a different structure, e.g., a generally rectangular frame, or a single support extending from the upper portion 32, or any other structure deemed suitable for this type of device by one skilled in the art. In this embodiment, the ends 34 include locking plates 36 for interlocking with the vertical support arms 20, discussed below.

Figure 4:
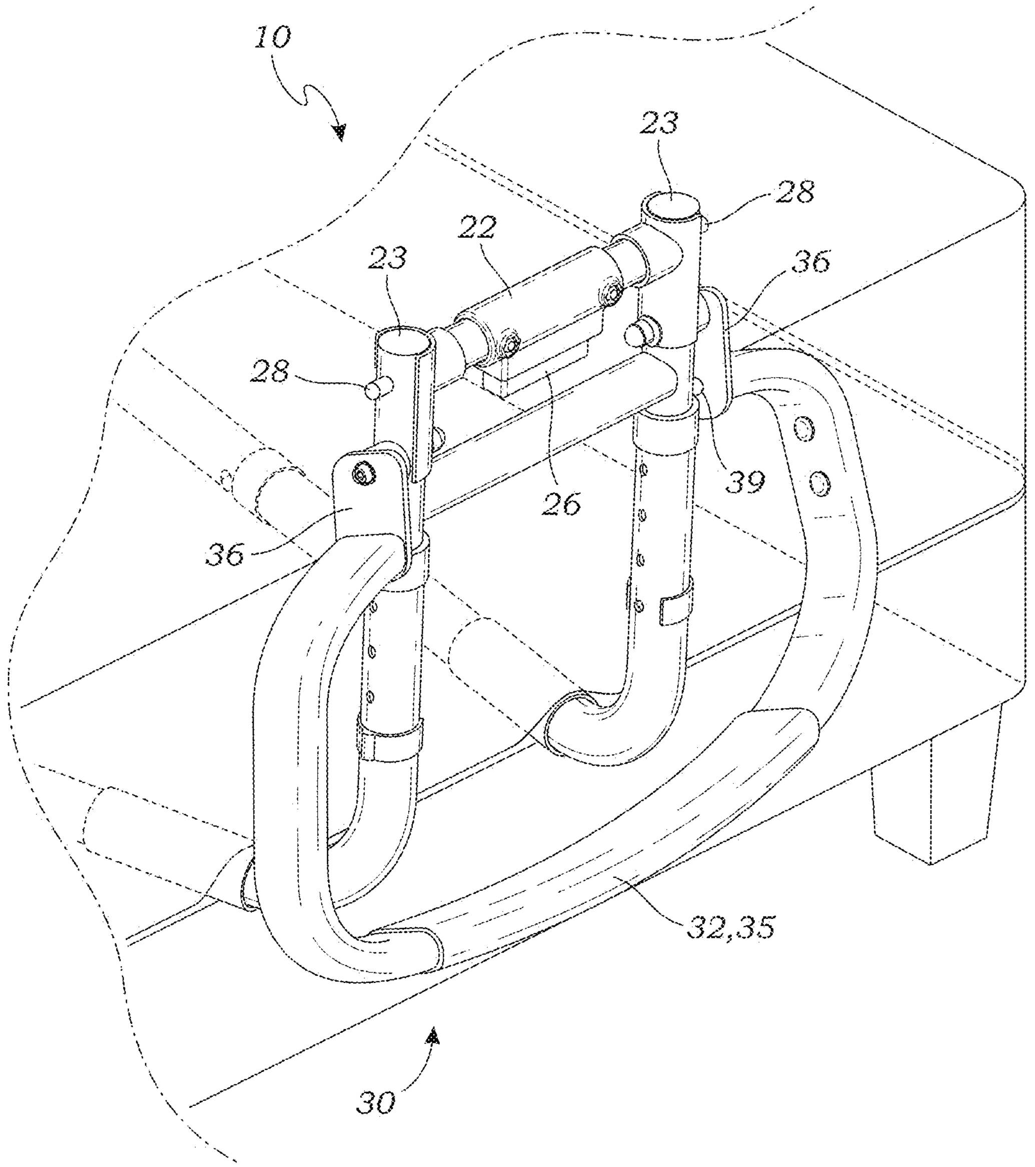
FIG. 4 is a perspective view of the bed assist rail, illustrating the handle rail in a lowered position.

In various embodiments, the handle rail 30 pivots between a raised position wherein the handle rail 30 extends upwardly above the mattress 12 (FIGS. 1-2), and a lowered position wherein the handle rail 30 is folded downwardly against the pair of vertical support arms 20 (FIG. 4). In some embodiments, the bed assist rail 10 includes a locking mechanism 38 for locking the handle rail 30 in the raised position, and a release mechanism 26 that releases the locking mechanism 38 to enable the handle rail 30 to pivot to the lowered position. In this embodiment, the locking mechanism 38 is in the form of a pair of retractable pins 28 that protrude laterally from the vertical support arms 20 adjacent the top end 23, wherein the pins 28 retractably engage with holes 39 in the locking plates 36 of the handle rail 30. Furthermore, in this embodiment, the release mechanism 26 is in the form of a press-release bar located on the underside of the connecting crossbar 22. In other embodiments, the press-release bar 26 may be positioned in any desired location on the vertical support arms 20 or the handle rail 30. In use, the press release bar can be compressed to retract the pins 28 and release the locking plates 36 for pivoting. In other embodiments, the locking mechanism 38 and release mechanism 26 may include alternative structures, e.g., clamps, magnets, switches, hooks, etc., which should be considered within the scope of the present invention. In some embodiments, the pivot connection of the handle rail 30 may be tightened or loosened (i.e., via an Allen key or similar) to enable ease of rotation.

Figure 3:
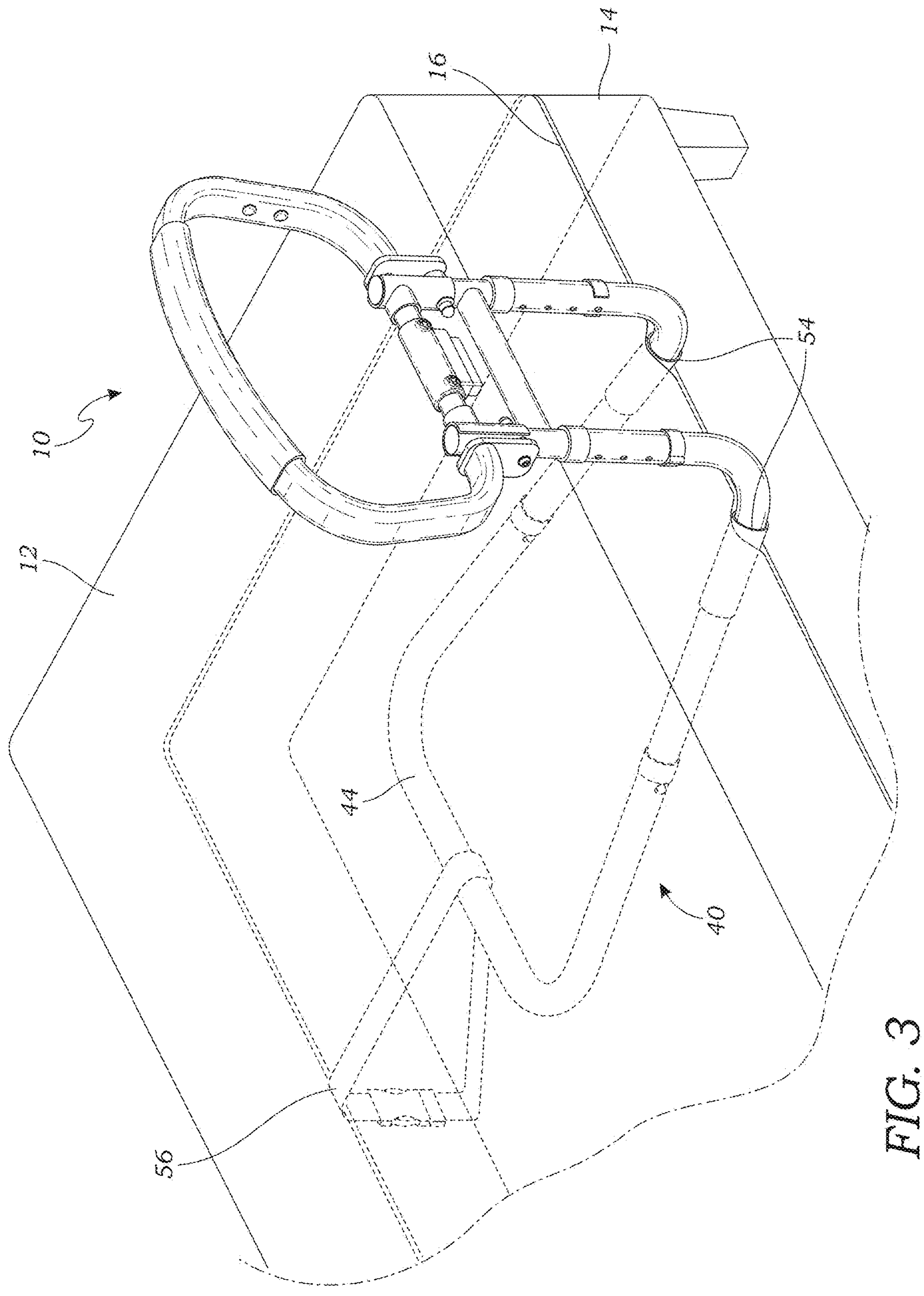
FIG. 3 is a perspective view of the bed assist rail installed so that an anchor portion is secured beneath a mattress.

As illustrated, the anchor structure 40 extends from the bottom ends 24 of the pair of vertical support arms 20, for supporting the pair of vertical support arms 20 in an upright configuration adjacent an edge 16 of a mattress 12 when the anchor structure 40 is positioned under the mattress 12 (FIGS. 3-4). In some embodiments, the anchor structure 40 includes a pair of elongate tubular arms 42 connected by a crosspiece 44 to form a U-shaped base. In this embodiment, the pair of elongate tubular arms 42 of the anchor structure 40 each include a horizontal portion 46 and an upwardly extending portion 48 that is generally perpendicular to the horizontal portion 46. In some embodiments, the horizontal portions 46 flare outwardly, which may help to create a stable support base. As shown in FIG. 2, in some embodiments, the upwardly extending portion 48 and the horizontal portion 46 may be telescopically separable and connected via holes 47 and spring-loaded pins 49. However, any means of attachment may be included, e.g., a clamp, slide lock, rotatable lock, etc., which may be included whether or not the components are telescopically engaged.

As shown in FIGS. 1-2, the bottom end of each of the pair of vertical support arms 20 telescopically engages one of the upwardly extending portions 48 of the anchor structure 40. In some embodiments, a height adjustment mechanism 50 removably interlocks each of the pair of vertical support arms 20 with one of the upwardly extending portions 48 at one of a plurality of positions, for adjusting the height of the handle rail 30 relative to the anchor structure 40. In this embodiment, the height adjustment mechanism 50 is in the form of a plurality of adjustment apertures formed in both the bottom ends 24 and in the upwardly extending portions 48. Once telescopically engaged, a pair of C-bolts 52 may be used to secure the components together, as shown. In one example, the handle may be locked in at 25, 24, 23, and 22 in. Obviously, in other embodiments, the distance between adjustment apertures may be any desired length. In addition, while four adjustment apertures 50 are illustrated herein, any number of adjustment apertures may be constructed, including only two, or any other number. In further embodiments, the components may be secured via a different means, e.g., a standard bolt and nut, a spring-release pin, etc., or any other means known in the art. Additionally, the height adjustment mechanism 50 may be any suitable mechanism, e.g., a clamp, slide lock, rotatable lock, etc., which may be included whether or not the components are telescopically engaged.

FIG. 3 is a perspective view of the bed assist rail 10 installed so that it is secured between the mattress 12 and a box frame 14. As shown in FIG. 3, the bed assist rail 10 is adapted to be mounted adjacent an edge 16 of the mattress 12, in this case between the mattress 12 and a box frame 14. In some embodiments, the anchor structure 40 includes a pair of annular cuffs 54, which may be located where the anchor structure 40 meets the edge 16 of the mattress 12, which may provide padding/friction to help secure the bed assist rail 10 in place, and to prevent wear of the mattress/boxframe/bedframe/anchor structure.

As shown in FIG. 3, the bed assist rail 10 may further include a securing mechanism 56 to additionally secure the bed assist rail 10 beneath the mattress 12. In this embodiment, the securing mechanism 56 is in the form of a strap with buckle. In use, the strap 56 is looped around the crosspiece 44 of the anchor structure 40, and pulled taut around the bed frame opposite the bed assist rail 10, and buckled in place. The strap 56 may include an adjuster for adjusting the length of the strap and ensuring it is pulled taut when installed. Alternatively, the strap 56 may be secured together via a means other than the buckle, e.g., by tying a knot, via a hook and loop fastener, buttons, etc. Furthermore, the securing mechanism 56 may be any equivalent mechanism, e.g., an elastic tube, rigid hook, pair of straps, etc.

FIG. 4 is a perspective view of the bed assist rail 10 installed between the mattress 12 and the box frame 14, illustrating the handle rail 30 in a lowered position. As shown in FIG. 4, the handle rail 30 pivots between a raised position wherein the handle rail 30 extends upwardly above the mattress 12 (FIGS. 1-3), and a lowered position wherein the handle rail 30 is folded downwardly against the pair of vertical support arms 20 (FIG. 4), using the locking and release mechanisms 38 and 26 discussed above.

This bed assist rail 10 is intended mainly for those who are elderly, pregnant, post-surgery, or disabled. It provides a stable support to get in and out of bed easily. An overly soft mattress should not be used, i.e., the mattress 12 should not significantly sink beneath a weight that is over approximately 12 lbs. Furthermore, the bed assist rail 10 may not be as functional on a bed that creates a gap between the edge 16 of the mattress 12 and the handle rail 30 (i.e., the mattress should be of sufficient width, and have a generally uninterrupted edge).

All components may include padding, protective cuffs, and various securing mechanisms such as bolts, etc. In some embodiments, the bed assist rail 10 is provided with a light (removably or fixedly mounted). In such an embodiment, the light may include different "modes" for use, for example: one press: "on" mode; two presses: motion sensing in dark; three presses: motion sensing in all lighting; four presses: "off" mode. Further additional features may include a clip-on pouch/bag that may be attached to the bed assist rail 10. Any other related features and/or accessories may be included, provided the invention is within the scope of the claims, as presented.

The title of the present application, and the claims presented, do not limit what may be claimed in the future, based upon and supported by the present application. Furthermore, any features shown in any of the drawings may be combined with any features from any other drawings to form an invention which may be claimed.

As used in this application, the words "a," "an," and "one" are defined to include one or more of the referenced item unless specifically stated otherwise. The terms "approximately" and "about" are defined to mean+/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A bed assist rail adapted to be mounted adjacent an edge of a mattress, the bed assist rail comprising:

a pair of vertical support arms that are laterally spaced by a connecting crossbar, each of the pair of vertical support arms having a top end, a bottom end, and a middle portion;

an anchor structure extending from the bottom ends of the pair of vertical support arms, for supporting the pair of vertical support arms in an upright configuration adjacent the edge of the mattress when the anchor structure is positioned under the mattress;

a handle rail that includes an upper portion that extends to ends, each of the ends being pivotally mounted to one of the pair of vertical support arms, the handle rail pivoting between a raised position wherein the handle rail extends upwardly above the mattress, and a lowered position wherein the handle rail is folded downwardly against the pair of vertical support arms;

a locking mechanism for locking the handle rail in the raised position;

a release mechanism that releases the locking mechanism to enable the handle rail to pivot to the lowered position;

wherein the locking mechanism includes a pair of retractable pins that protrude laterally from the vertical support arms adjacent the top end, wherein the ends of the handle rail each include a locking plate; and wherein the pins retractably engage with holes in the locking plates of the handle rail; and wherein the release mechanism includes a press-release bar located on the underside of the connecting crossbar, configured so that when the press release bar is compressed against the connecting crossbar, the pins are both retracted from the locking plates so that the handle rail may pivot.

2. The bed assist rail of claim 1, wherein the anchor structure includes a pair of elongate tubular arms connected by a crosspiece to form a U-shaped base.

3. The bed assist rail of claim 2, wherein the pair of elongate tubular arms of the anchor structure each include a horizontal portion and an upwardly extending portion that is generally perpendicular to the horizontal portion; and wherein each of the pair of vertical support arms telescopically engages one of the upwardly extending portions.

4. The bed assist rail of claim 3, further comprising a height adjustment mechanism that removably interlocks each of the pair of vertical support arms with one of the upwardly extending portions at one of a plurality of positions, for adjusting the height of the handle rail relative to the anchor structure.

5. The bed assist rail of claim 3, wherein the height adjustment mechanism comprises:

a plurality of adjustment apertures formed in both the bottom ends and in the upwardly extending portions; and fasteners that secure the bottom ends to the upwardly extending portions once the adjustment apertures are aligned at the desired height.

6. The bed assist rail of claim 1, wherein the anchor structure is generally perpendicular to the pair of vertical support arms.

7. The bed assist rail of claim 1, wherein the pair of vertical support arms are tubular in construction.

* * * * *